United States Patent
Bump et al.

(10) Patent No.: US 7,129,411 B2
(45) Date of Patent: Oct. 31, 2006

(54) FASTENING SYSTEM

(76) Inventors: Jeffrey A. Bump, 65 Dana Hill Rd., Sterling, MA (US) 01564; Thomas M. Capone, 11 Pheasant Hill Rd., West Boylston, MA (US) 01583

(*) Notice: Subject to any disclaimer, the term of this patent is extended or adjusted under 35 U.S.C. 154(b) by 0 days.

(21) Appl. No.: 11/242,093

(22) Filed: Oct. 3, 2005

(65) Prior Publication Data

US 2006/0131046 A1    Jun. 22, 2006

Related U.S. Application Data

(60) Provisional application No. 60/636,647, filed on Dec. 17, 2004.

(51) Int. Cl.
*H01H 9/02* (2006.01)

(52) U.S. Cl. ............... 174/58; 174/54; 174/61; 174/63; 248/343

(58) Field of Classification Search ............ 174/58, 174/54, 57, 61, 63; 220/3.2, 3.7, 3.8; 248/343, 248/906
See application file for complete search history.

(56) References Cited

U.S. PATENT DOCUMENTS

| | | | |
|---|---|---|---|
| 2,143,278 A | * | 1/1939 | Wilmer ............ 220/3.92 |
| 2,214,388 A | | 9/1940 | Summers ............ 287/58 |
| 2,491,742 A | | 12/1949 | Lein |
| 2,581,755 A | | 1/1952 | Dieffenderfer |
| 2,658,704 A | | 11/1953 | Smith |
| 2,759,390 A | | 8/1956 | Edwards ............ 85/40 |
| 3,392,943 A | | 7/1968 | Baxter |
| 3,963,204 A | | 6/1976 | Liss |
| 3,966,152 A | | 6/1976 | Bromberg |
| 4,272,047 A | | 6/1981 | Botka ............ 248/74 |
| 4,580,689 A | | 4/1986 | Slater |
| 4,605,816 A | | 8/1986 | Jorgensen et al. |
| 4,666,055 A | | 5/1987 | Lewis |
| 4,805,856 A | | 2/1989 | Nicoli et al. ............ 248/74.3 |
| 4,874,905 A | | 10/1989 | Schnell et al. |
| 5,434,359 A | | 7/1995 | Schnell |
| 6,102,347 A | | 8/2000 | Benoit ............ 248/230.8 |
| 6,186,451 B1 | | 2/2001 | Benoit ............ 248/74.3 |
| 6,338,225 B1 | | 1/2002 | Hayes |
| 6,557,305 B1 | | 5/2003 | Hayes |
| 6,674,004 B1 | | 1/2004 | Uchida et al. ............ 174/68.3 |
| 6,961,979 B1 | | 11/2005 | Wendle ............ 24/16 |

* cited by examiner

*Primary Examiner*—Dhiru R. Patel
(74) *Attorney, Agent, or Firm*—Burns & Levinson LLP; Kenneth S. Sachar; Jacob N. Erlich

(57) ABSTRACT

A device for more reliable and rapid securing to or within a component. The device incorporates therein or independently uses a substantially flexible member to secure the device within the component.

36 Claims, 11 Drawing Sheets

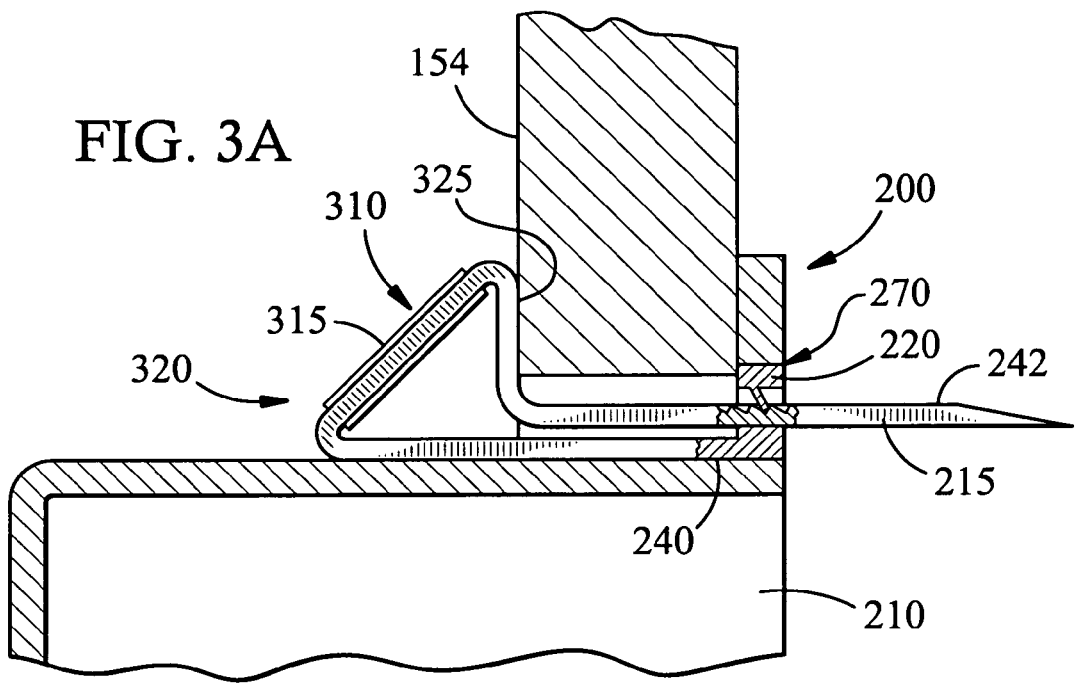
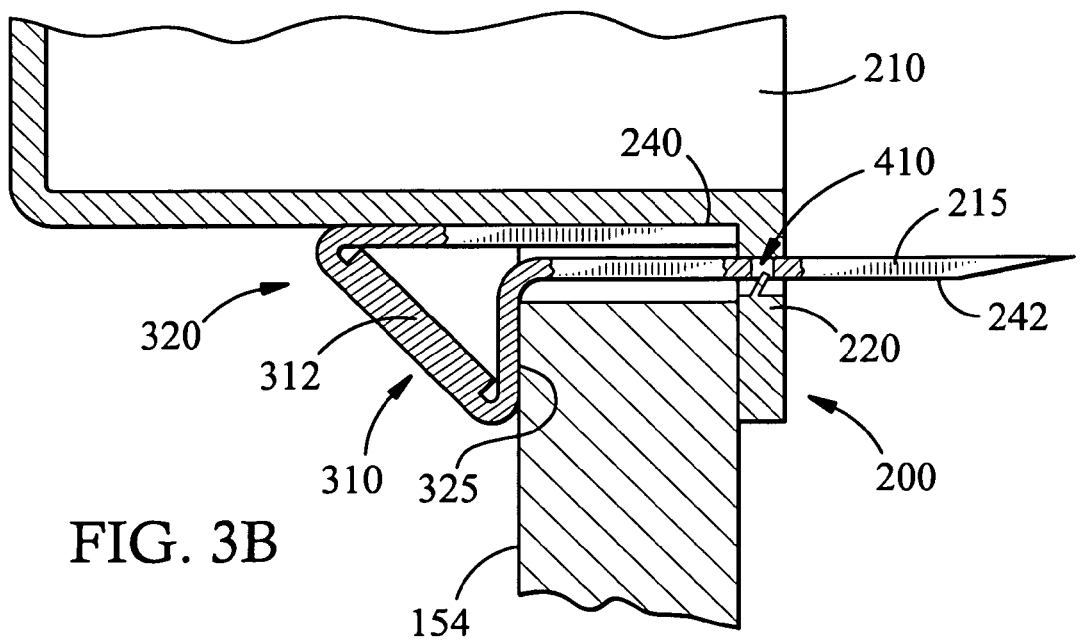

FASTENING SYSTEM

CROSS REFERENCE TO RELATED APPLICATIONS

This application claims priority from U.S. Provisional Application No. 60/636,647, filed Dec. 17, 2004 and incorporated herein by reference in its entirety.

BACKGROUND OF INVENTION

The invention is directed to the fastening field, particularly to the mounting of devices within a component. An electrical work box is a receptacle, generally of metallic or of thermoplastic composition, designed to support an electrical device. The electrical device may be a switch or plug receptacle in single, dual or multiple "gang" configurations, a lighting fixture, a ceiling fan, a speaker, or an alarm. The electrical work box may also provide wiring junctions for electrical applications, such as low voltage applications associated with audio/visual devices, telephone devices and computer networking devices.

In new construction, electrical work boxes are generally mounted to exposed studs or framing elements using nails or screws. In existing construction, electrical work boxes may be affixed to existing walls, including wallboard, lathe and plaster or other wall surfaces that have been mounted over framing. Such boxes are commonly referred to as old work boxes.

Old work boxes may include pressure/spring retaining latches. The latches are usually vertically and/or horizontally mounted to the exterior sides of the boxes and allow the box to be pushed through a wall opening. Once through the opening, the latches deploy by spreading beyond the rear edge of the wall opening. Pawls, commonly referred to as ears, wings, or fingers, are mounted on two or more opposing corners of the electrical work box. When deployed by means of a tightening screw, the pawls, in conjunction with opposing flanges integrally mounted on the front edges of the box, serve to clamp the box to the wall.

The retaining mechanisms employing latches and pawls often fail to securely mount the old work boxes in place. Where wall thickness varies, a thicker than typical wall may preclude pressure/spring retaining latches from expanding. A thinner than normal wall may result in space between the retaining latch and the rear wall surface and allow the box to move back and forth within the wall. Irregularities in the posterior wall surface in lathe and plaster walls or in insulating materials may also prevent pressure/spring retaining latches and/or screw activated pawls from properly deploying.

Further, in mounting electrical boxes using screw activated pawls, deployment of the pawls may over tighten the screw, resulting in stripping the threads in the pawl. As a result, the box must be dismounted and discarded and installation must be started over with a new box.

In view of the above difficulties, there is a need for a more reliable, quicker to use, and more versatile fastening system for electrical work boxes.

BRIEF SUMMARY OF THE INVENTION

The needs of the invention set forth above as well as further and other needs and advantages of the present invention are achieved by the embodiments of the invention described herein below.

According to one aspect of the invention, a device includes a structure having at least one outer flange, a substantially flexible member with an outer portion, an inner portion, and a rigid region, and a locking mechanism capable of being coupled to the substantially flexible member to secure the container to a component. The container may be made of a metal, a thermoplastic material, or a thermoset material.

In one embodiment of the invention, the device may be an electrical work box and the structure may be a container. In a certain embodiment, the rigid region may be an inner flange, which may be located at the inner portion of the substantially flexible member. In another embodiment, the locking mechanism may be integral with the container. In a further embodiment, the container may include at least one side channel. In an additional embodiment, the rigid region may lie between the outer and the inner portion of the substantially flexible member and the substantially flexible member may be coupled to a rigid channel at the rigid region. In certain embodiment, the rigid region may be integral with the substantially flexible member.

In a further embodiment, the inner portion of the substantially flexible member may be coupled to the container. In a still another embodiment, the substantially flexible member may be integral with the locking mechanism. In a still further embodiment, the substantially flexible member may be a cable tie.

In a still further embodiment, the substantially flexible member may include at least one groove. The locking mechanism may include a flap with an edge complementary to the groove.

In another aspect of the invention, a method for mounting a structure to a component includes inserting a substantially flexible member through an opening within the component, further through an opening in a portion of the structure of a device and through a locking mechanism, inserting the structure into an opening in the component, and pulling the substantially flexible member through the locking mechanism until a rigid region of said substantially flexible member is coupled to a surface of the component and an outer portion of the substantially flexible member is engaged with the locking mechanism.

In an embodiment of the invention, the device may be an electrical work box an the structure may be a container. In another embodiment, the method may include resting an outer flange on an outer surface of the component and further include engaging a flap of the locking mechanism with a recess in the outer portion of the substantially flexible member. The recess may be a groove or an opening.

In a further embodiment of the invention, the method may include creating an opening in the component where the component maybe a wall, a ceiling, or a floor or the like, and the electrical box may be replaced by a variety of devices which need to be inserted within the component and secured thereto.

In additional embodiments of the invention, the locking mechanism may be integral with the substantially flexible member or integral with the container.

In a certain embodiment of the invention, the rigid region may lie between the outer portion and an inner portion of the substantially flexible member. The rigid region may be integral with the substantially flexible member or may be coupled to a rigid channel at the rigid region. In another embodiment of the invention, an inner portion of the substantially flexible member may be coupled to the container. In a still further embodiment of the invention, the substantially flexible member may be transportable through the locking mechanism in a single direction.

According to an additional aspect of the invention, a device includes a structure having at least one outer flange, a substantially flexible member with an outer portion and an inner portion, and a locking mechanism capable of being coupled to the substantially flexible member to secure the container to a component.

In a certain embodiment of the invention, the device may be an electrical work box and the structure may be a container. In a further embodiment, the substantially flexible member may include at least one region of substantially reduced thickness.

In an additional aspect of the invention, a fastening system for use in securing a device within a component includes a substantially flexible member that includes an outer portion, an inner portion, and a rigid region, and a locking mechanism capable of being coupled to the substantially flexible member in order to secure said structure to the component.

For a better understanding of the present invention, together with other and further objects thereof, reference is made to the accompanying drawings and detailed description and its scope will be pointed out in the appended claims.

BRIEF DESCRIPTION OF THE DRAWINGS

FIG. 3A is an illustration of a side view of an embodiment of the present invention, including a substantially flexible member, containing a rigid region where a locking mechanism is integrated into the container by insertion and the flexible member is integral with the locking mechanism;

FIG. 3B is an illustration of a side view of an embodiment of the present invention, including a substantially flexible member, containing a rigid region where a locking mechanism is integral with the container and the substantially flexible member is coupled to the container;

DETAILED DESCRIPTION OF THE INVENTION

Embodiments of the present invention provide a fastening system that may more quickly and more reliably mount devices such as electrical work boxes to components such as walls, ceilings, and floors than by the means currently represented by the prior art systems described above. The fastening system includes at least one substantially flexible member that contains a shaft or ribbon with depressions, that is, recesses or grooves, separated by teeth, molded or embossed into the ribbon. Rigid regions such as preformed securing mechanisms, including rigid flanges located at the ends of the substantially flexible members, or self-formed securing mechanisms, including rigid elements located at an interior position of the substantially flexible members, engage the rear surface of the component such as a wall. Pulling of the substantially flexible member through a likewise conventional locking mechanism causes the device to be held in position against a component. In the case of a rigid element, pulling of the substantially flexible member through the locking mechanism results in a buttress structure, which provides the support for the device against the component.

The fastening system of the present invention, using substantially flexible members, allows for quicker and more reliable installation than does the existing system employing screw activated pawls. No hand tightening of screws is necessary and there may be less interference from obstructions. The flexible member fastening system accommodates a wide range of component thicknesses and is less prone to over tightening, as an installer of the electrical work box is more aware of applying an excess of tension to the substantially flexible member than an excess of torque to a screwdriver in prior art electrical work box fastening systems.

Figure 1A:
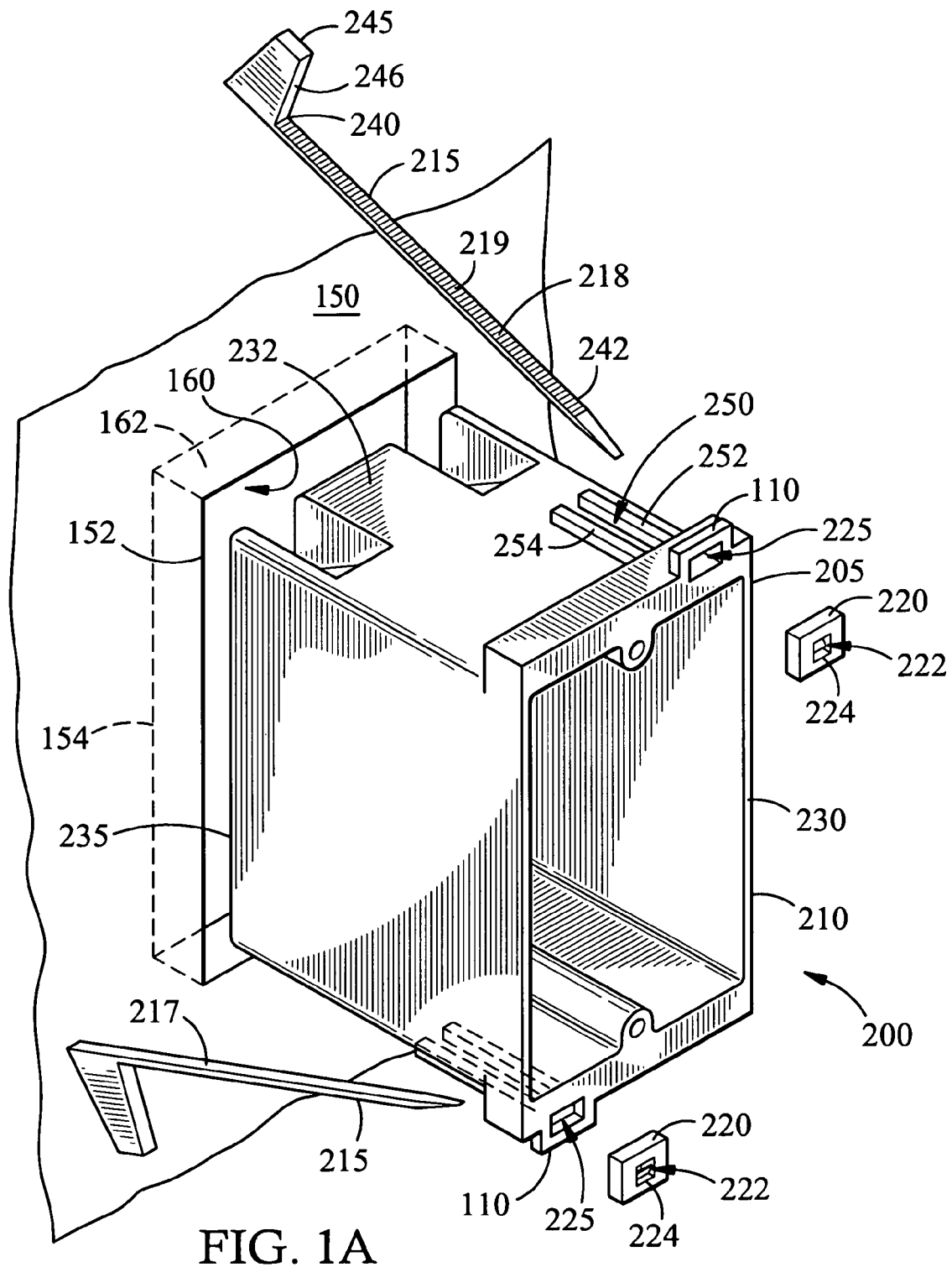
FIG. 1A is an illustration of an exploded view of an embodiment of the present invention, including a pair of substantially flexible members with solid flanges and separate locking mechanisms, which secure an electrical work box to a component.

FIG. 1A illustrates an embodiment of the invention for installation in an existing component 150, such as a wall, a ceiling, a floor, etc. An electrical work box 200 includes a structure, in this case, container 210, one or more substantially flexible members 215, and one or more locking mechanisms 220. The container 210 may be made of a metal, thermoplastic material, or thermoset material and contains two outer flanges 110 integrated into the front surface 230 of the container 210. The container may be a receptacle. As with all embodiments of the present invention, the use of the terms electrical box and wall is provided for a clear understanding of the invention, although other devices which find use inserted or fastened within a component may also be considered part of the present invention.

Figure 1B:
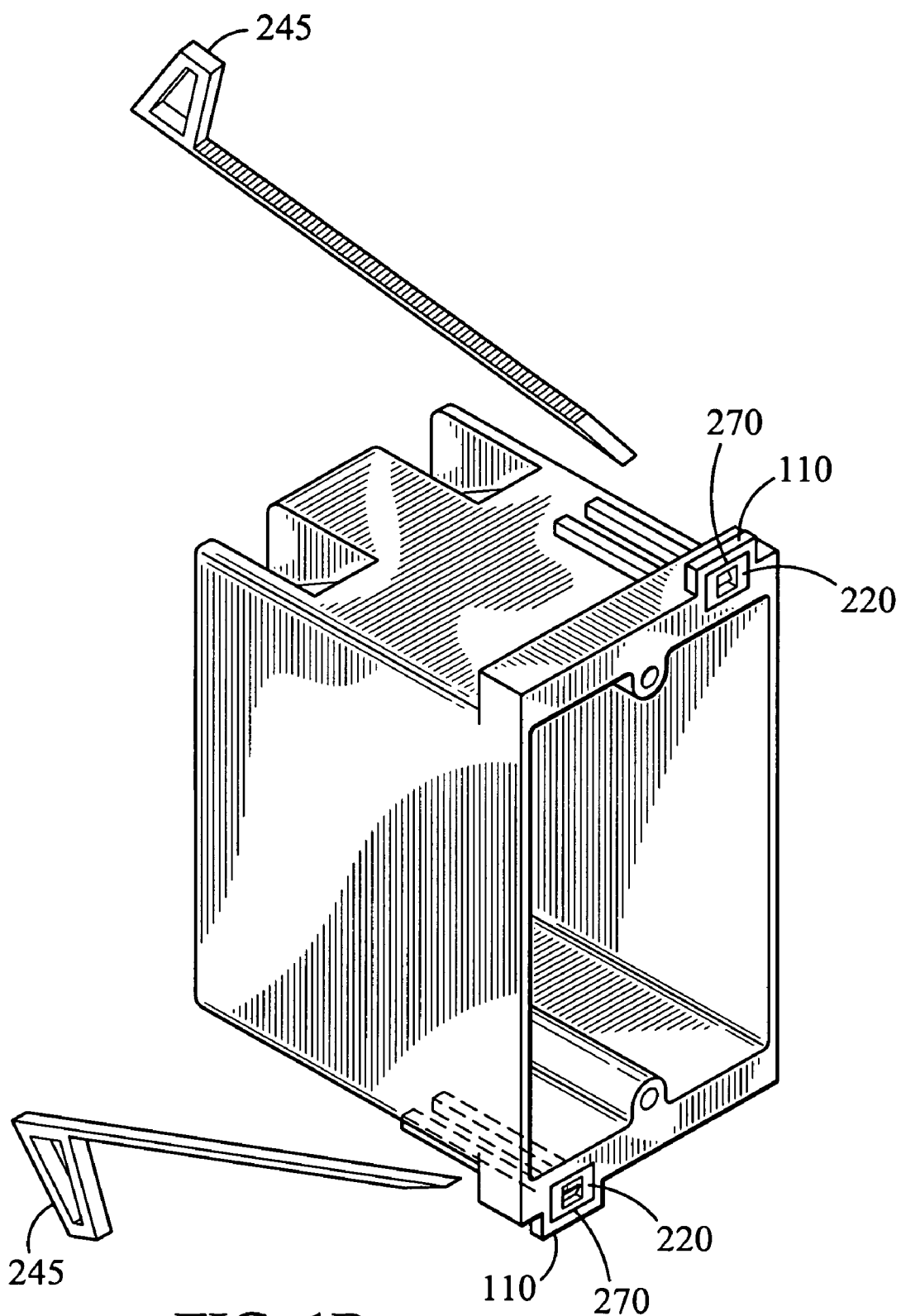
FIG. 1B is an illustration of an exploded view of an embodiment of the present invention, including a pair of substantially flexible members with hollow flanges, which secure an electrical work box with integral locking mechanisms to a component.

Two outer flanges 110 are incorporated, often integrally molded, into opposite corners of the electrical work box 200 and prevent the electrical work box 200 from migrating posterior through an opening 160 cut in a component 150 with a front surface 152 and a rear surface 154 to accommodate the electrical work box 200. The outer flange 110 may contain a hole 225 that may accommodate a substantially flexible member 215. A single outer flange 110 may completely coincide with the front surface 230 of the container 210. An opening in the completely coinciding outer flange 110 may be square, as in this representation, or round. The locking mechanism 220 may be set into a recessed hole 270 in the outer flange 110 (FIG. 1B).

The substantially flexible member 215 has an inner region 240 and an outer region 242. The substantially flexible member 215 may be fabricated from nylon or other thermoplastic materials and may include a generally flat extruded shaft or ribbon 217, where recesses 219, such as grooves or holes, may be integrated along one surface 218 of the ribbon 217.

The locking mechanism 220, separate (FIG. 1A) or incorporated into the container 210 (FIG. 1B), allows the ribbon 217 to be drawn through in only one direction, locking in each recess 219 until a desired maximum tightness is achieved. The locking mechanism 220 may include an internal flap 222, possibly square in shape, which may extend approximately half way down an open central channel 224 to accommodate, in a complementary manner, the recess 219 of the substantially flexible member 215 and may be angled so that the substantially flexible member 215 can only be drawn one way, locking onto a recess 219 and preventing retraction. If the dimensions of the hole 225 exceed the dimensions of a cross section of the flexible member 225 where the locking mechanism 220 is separate or if the locking mechanism 220 is cylindrical and is nonfixedly incorporated to the container 210, the locking mechanism 220 may be rotated prior to tightening, resulting in rotation of the ribbon 217.

At the inner portion 240 of the substantially flexible member 215 is an inner flange 245, which is a rigid region serving to secure the electrical work box 200 to the component 150. The inner flange 245 may be solid (FIG. 1A) or hollowed out (FIG. 1B), integral with the substantially flexible member 215 or a separate component coupled to the substantially flexible member 215.

A channel 250 formed by two formed segments (252 and 254) integrally molded into the electrical work box 200 positions the substantially flexible member 215 so that the inner flange 245 is properly orientated to secure the electrical work box 200 to the component 150. There is a channel 250 on opposite corners of the electrical work box 200. In certain applications, (including the mounting of ceiling fans or other heavy components), the channel 250 may be located on each of the four corners of the electrical work box 200 to accommodate four substantially flexible members 215.

Prior to the installation of the electrical work box 200 into the opening 160 in the component 150, outer region 242 of each substantially flexible member 215, is inserted through its locking mechanism 220. The length of the substantially flexible member 215 may be sufficient for the inner flange 245 to be bent behind a rear surface 235 of container 210. After insertion of the electrical work box 200 so that the outer flanges 110 rest against the front surface 152 of component 150, the inner end 242 of the substantially flexible member 215 and the inner flange 245 spring back so that the substantially flexible member 215 is substantially straight and the inner flange 245 is substantially perpendicular to an adjacent surface 232 of container 210. Pulling of the outer region 242 of the substantially flexible member 215 through the locking mechanism 220 so that a latching surface 246 of inner flange 245 contacts the rear surface 154 of component 150 secures the electrical work box 200 to the component 150. After securing of the electrical work box 200 to the component 150, the outer region 242 of the substantially flexible member 215 beyond the locking mechanism 220 may be removed.

Installation of electrical work box 200 may also be accomplished by first inserting the outer region 242 of the substantially flexible member 215 through the locking mechanism 220 and pulling the substantially flexible member 215 through until the inner flange 245 overlaps a rear portion 234 of an adjacent surface 232 of the electrical work box 200. The inner flange 245 is then rotated so that the inner flange 245 is substantially parallel to the adjacent surface 232. Rotation may result in twisting of the substantially flexible member 215 or may be achieved by rotation of a cylindrical locking mechanism non fixedly incorporated or by rotation of the substantially flexible member 215 having cross sectional dimensions smaller than the size of the hole 225 where the locking mechanism 220 is separate.

The electrical work box 200 is then inserted through the opening 160 in component 150 until the outer flanges 225 of the electrical work box 200 rest against the front surface 152 of the component 150. Initially, during the insertion, the orientation of the inner flange 225 where the substantially flexible member 225 is twisted is maintained by contact with a surface 162 of the opening 160. As the inner flange 225 passes beyond the rear surface 154 of component 150, the outer flange 225 twists until it is substantially perpendicular to the adjacent surface 232 of the container 210. For a non fixedly incorporated or a separate locking mechanism 220, rotation of the locking mechanism results in the outer flange 225 being perpendicular to the adjacent surface 232 of the container. Pulling of the outer end 242 of the substantially flexible member 215 through the locking mechanism 220 so that the latching surface 246 of the inner flange 245 contacts the rear surface 154 of component 150 secures the electrical work box 200 to the component 150. After securing of the electrical work box 200 to the component 150, the outer region 242 of the substantially flexible member 215 beyond the locking mechanism 220 may be removed.

Figure 2A:
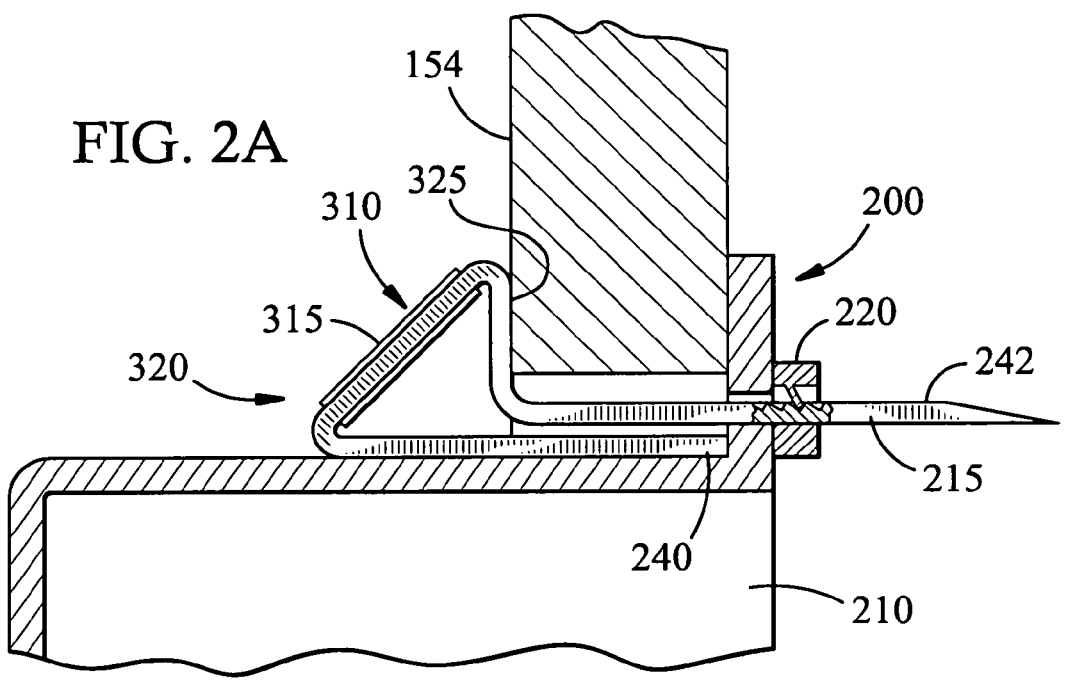
FIG. 2A is an illustration of a side view of an embodiment of the present invention, including a substantially flexible member, containing a rigid region comprising a rigid channel.
Figure 2B:
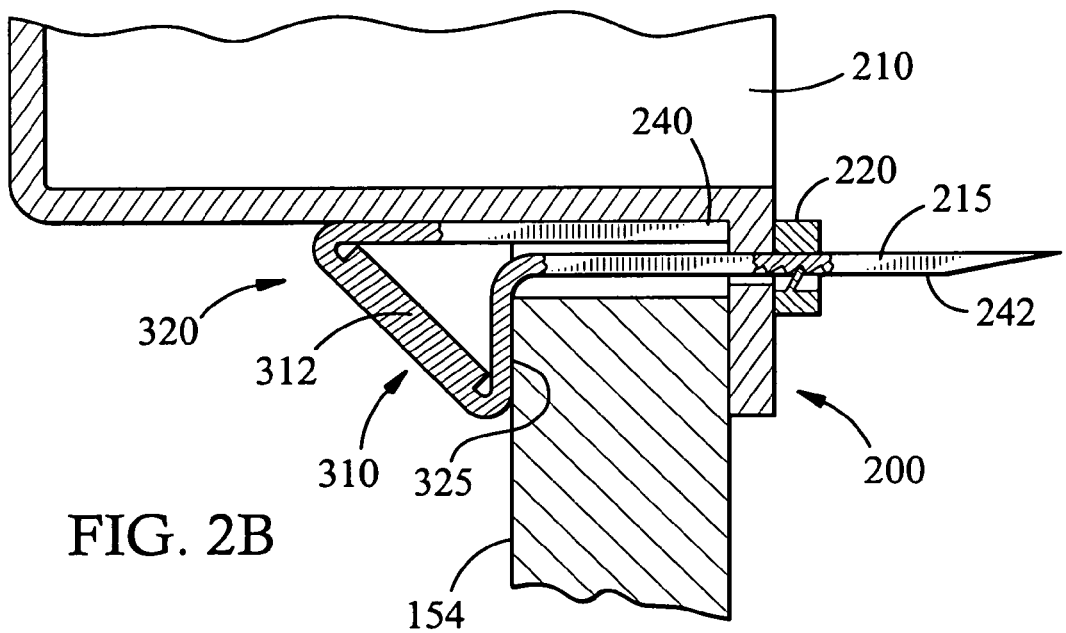
FIG. 2B is an illustration of a side view of an embodiment of the present invention, including a substantially flexible members, containing a rigid region integral with the substantially flexible member.

FIG. 2 illustrates another embodiment of the invention where the inner portion 240 of the substantially flexible member 215 is coupled to the container 210 and the substantially flexible member 215 contains a rigid element 310 as a rigid region. The rigid element 310 may be integrally molded into the substantially flexible member 215, as rigid molded segment 312 (FIG. 2B), or may be formed when a rigid channel 315 is coupled to the substantially flexible member 215, as, for example, by crimping, or when the substantially flexible member 215 is threaded through the rigid channel 315 (FIG. 2A).

The length of the substantially flexible member 215 is sufficient that when the outer portion 242 is passed through the locking mechanism, a loop 520 is formed where the rigid element 310 lies beyond the rear surface 235 of the container 210. As the electrical work box 200 is inserted through the opening 160 in the component 150, the loop 520 is compressed to an extent that the combination of the compressed loops 410 and the container passes through the opening 160. For a sufficiently thin rigid element 310, the rigid region need not lie beyond the rear surface 235 of the container 210, but may be held against a surface of the container 210 during insertion. (FIG. 4E).

When outer portion 242 of the substantially flexible member 215 is pulled through the locking mechanism 220, a triangular buttress 320 is formed. When the substantially flexible member 215 can no longer be pulled through the locking mechanism 220, a support portion 325 of the substantially flexible member 215 that is adjacent to the rigid element 310 is in contact with the rear surface 154 of component 150 and holds the electrical work box 200 against the component 150.

Rather than as a separate item, the locking mechanism 220 may be incorporated into the container 210. FIG. 3A illustrates an embodiment where the locking mechanism 220 is integrated into the container 210 by insertion and the inner portion 240 of the flexible member 215 is coupled to the locking mechanism 220. In this case, a standard cable tie may be used and a rigid channel 315 crimped over a portion of the substantially flexible member 215 to form a rigid element 310. FIG. 3B illustrates an embodiment where the locking mechanism 220 is integral with the container 210 and the inner portion 240 of the substantially flexible member 215 is coupled to the container. Also, the recess is a hole 410.

Figure 4A:
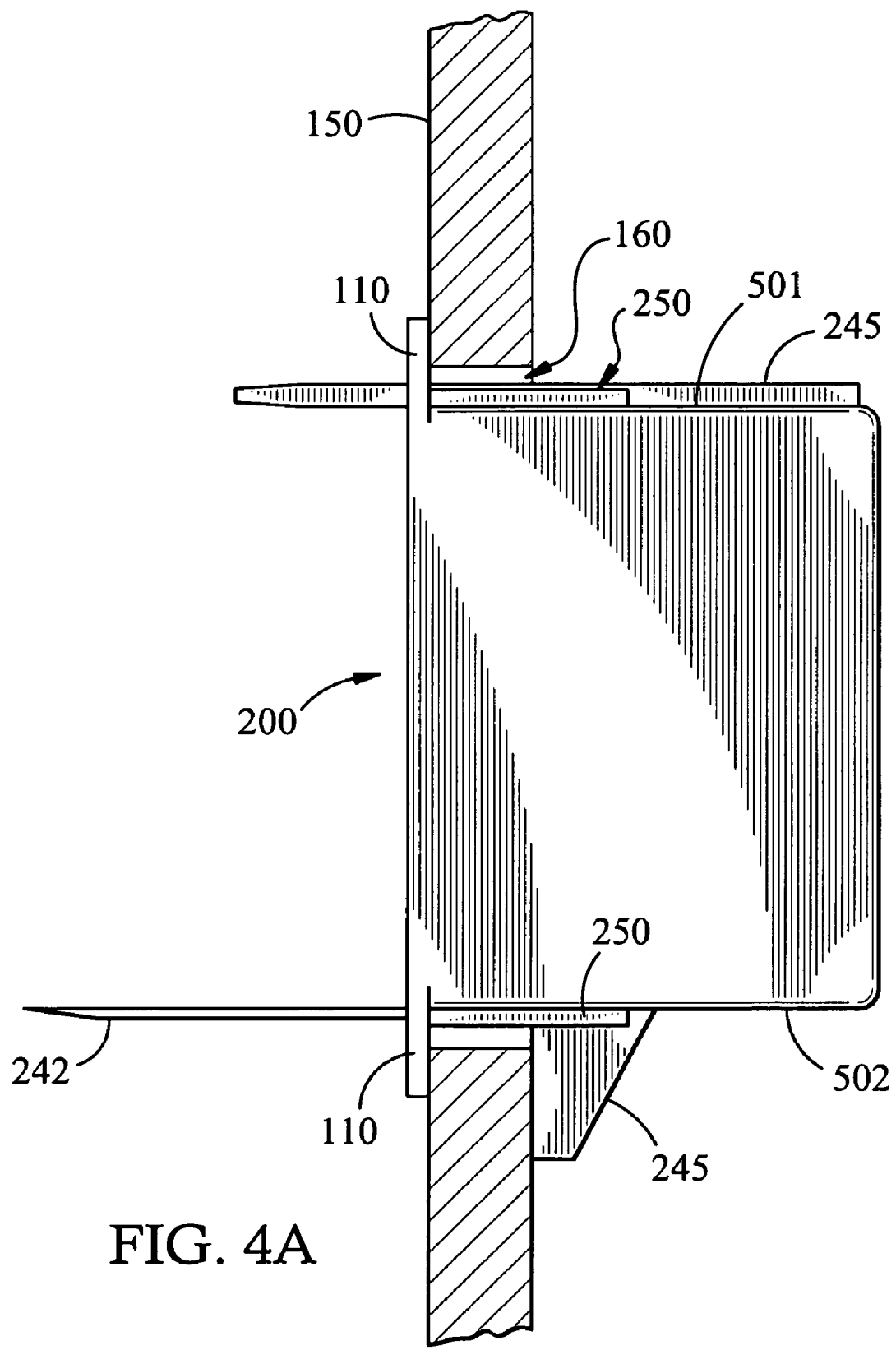
FIG. 4A is an illustration of an embodiment of the present invention, which shows a side view of pre-deployment and post-deployment of rigid regions where the rigid region is a solid inner flange.
Figure 4B:
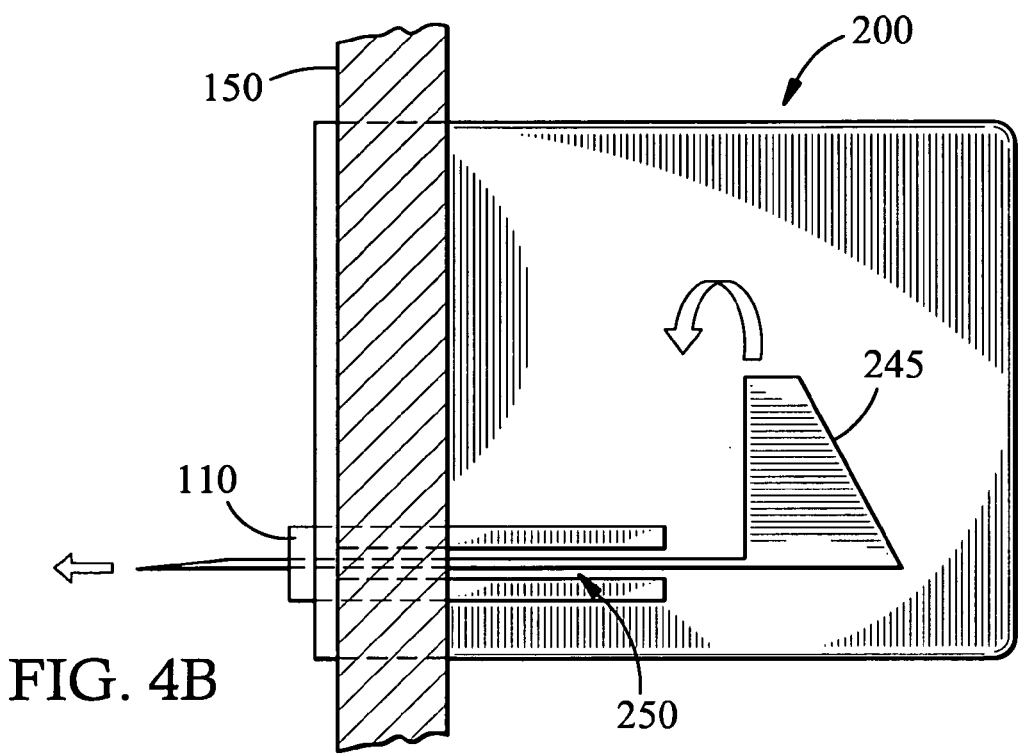
FIG. 4B is an illustration of an embodiment of the present invention, which shows a top view of pre-deployment of rigid regions where the rigid region is a solid inner flange.
Figure 4C:
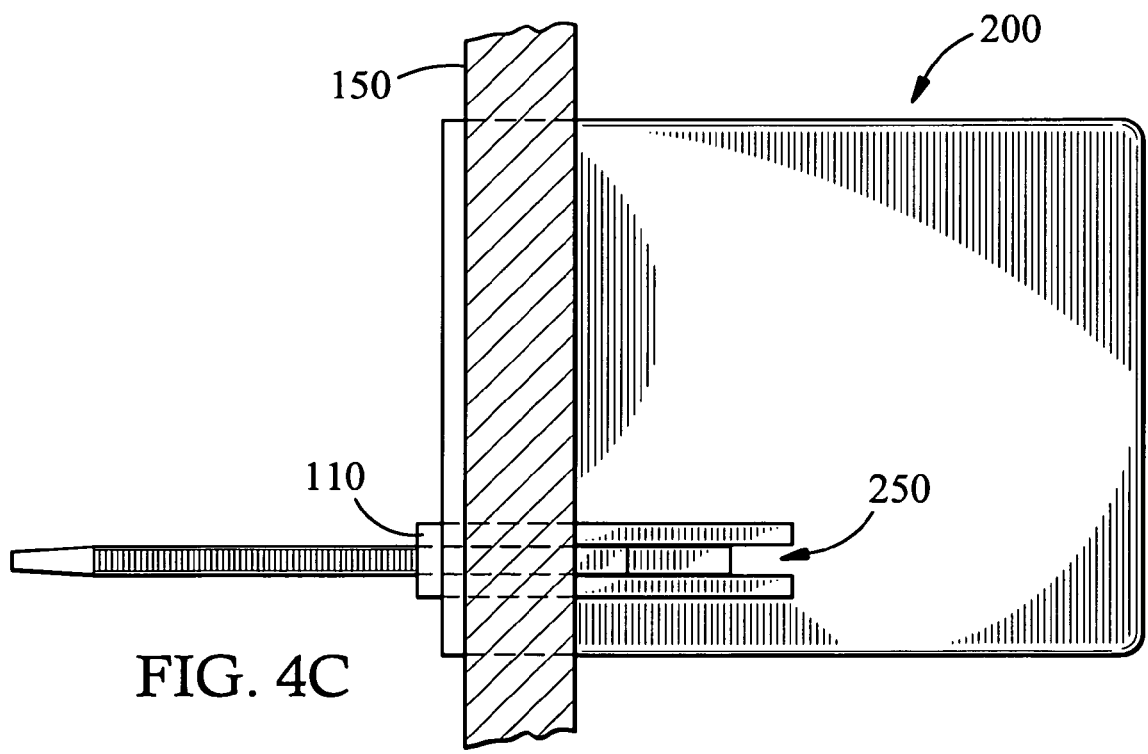
FIG. 4C is an illustration of an embodiment of the present invention, which shows a bottom view of post-deployment of rigid regions where the rigid region is a solid inner flange.
Figure 4D:
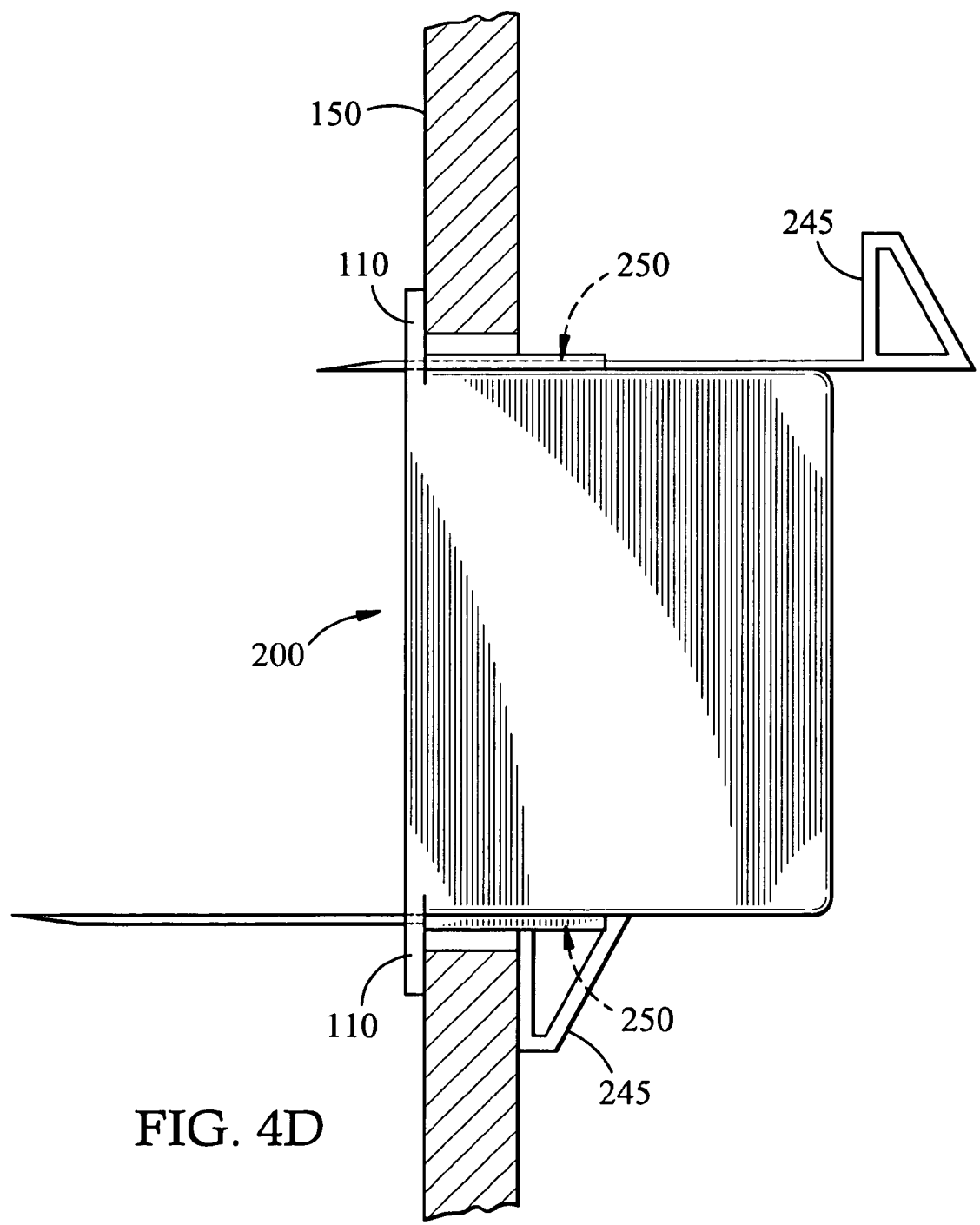
FIG. 4D is an illustration of an embodiment of the present invention, which shows a side view of pre-deployment and post-deployment of rigid regions where the rigid region is a hollow inner flange.
Figure 4E:
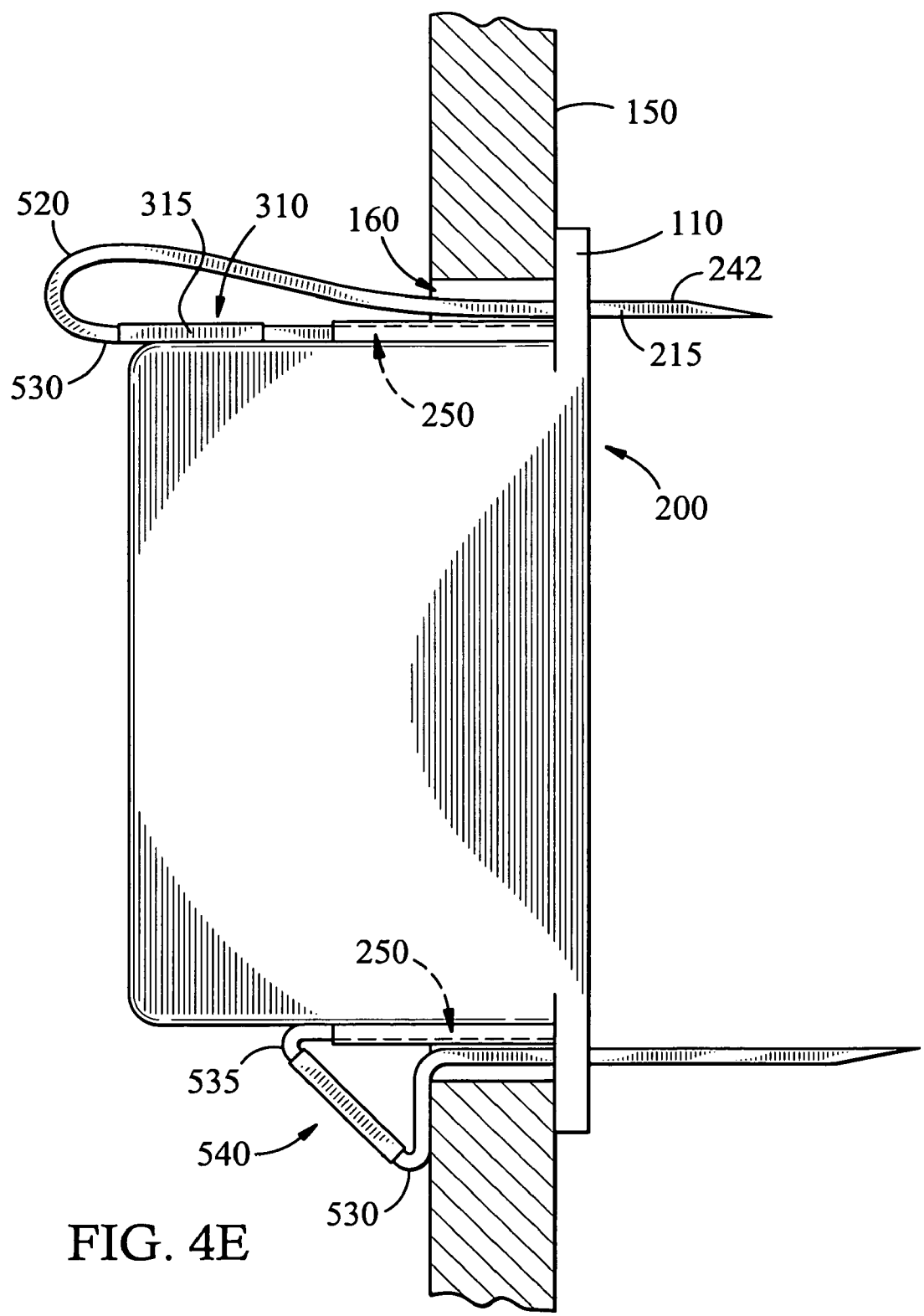
FIG. 4E is an illustration of an embodiment of the present invention, which shows a side view of pre-deployment and post-deployment of rigid regions where the rigid region includes a rigid channel coupled to a flexible member.

FIGS. 4A, 4D, and 4E illustrate a pre-deployment (above) and a post-deployment (below) state of the electrical work box 200. FIG. 4A illustrates a side view of a solid inner flange 245 oriented parallel to electrical work box top 501 during insertion of the electrical work box 200 through opening 160 in component 150 and perpendicular to the electrical work box bottom 502 following reorientation by rotation through 90 degrees. FIG. 4B illustrates a top view of the electrical work box 200 showing the orientation of the inner flange 245 following insertion of the electrical work box 200 but prior to reorientation of the inner flange 245. FIG. 4C illustrates a bottom view of the inner flange 245 following reorientation by rotation by rotation by 90 degrees so as to be oriented perpendicular to the bottom 502 of the electrical work box 200. FIG. 4D illustrates insertion of electrical work box 200 and reorientation of hollow inner flange 245.

FIG. 4E illustrates a pre-deployment and a post-deployment state of the electrical work box 200 where rigid region 310 corresponds to the rigid channel 315 coupled to the substantially flexible member 215. During pre-deployment, the substantially flexible member 215 forms a loop 520. During deployment, the outer end 242 of substantially flexible member 215 is pulled away from component 150, causing an outer end 530 of rigid channel 315 to be coupled to the component 150, thereby preventing further pulling away of the substantially flexible member 215. The loop 520 assumes a triangular shape 540 where the rigid channel 315 couples to the component 150 at the outer end 530 and to the electrical work box 200 at an inner end 535.

Figure 5:
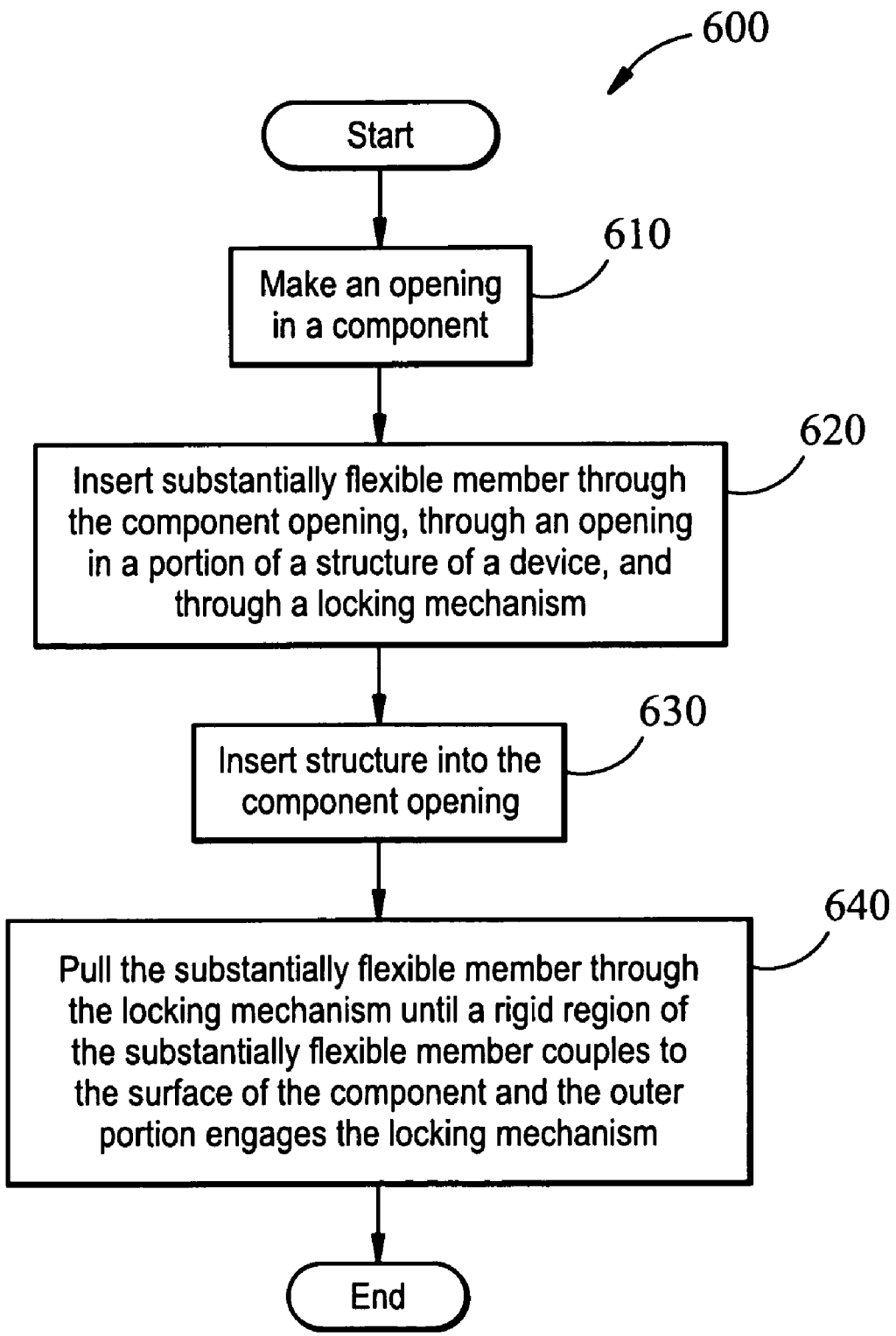
FIG. 5 is a process flow diagram illustrating one method for mounting a device to a component.

FIG. 5 illustrates a process 600 of the present invention for mounting a device that includes a structure that may be the container 210 to a component 150. In Step 610, an opening 160 is created in the component 150. In Step 620, the substantially flexible member 215 is inserted through the opening 160, through the opening 270 in a portion of the device such as the structure, and through locking mechanism 220. In the case of the substantially flexible member 215 containing the rigid element 310, insertion results in formation of the loop 520. In step 630, the container 210 is inserted into the opening 160 in the component 150. In Step 640, the substantially flexible member 215 is pulled through the locking mechanism 220 until a rigid region of the substantially flexible member 215 couples to a surface 154 of the component 150 and an outer portion 242 of the substantially flexible member 215 engages with the locking mechanism 220.

Figure 6:
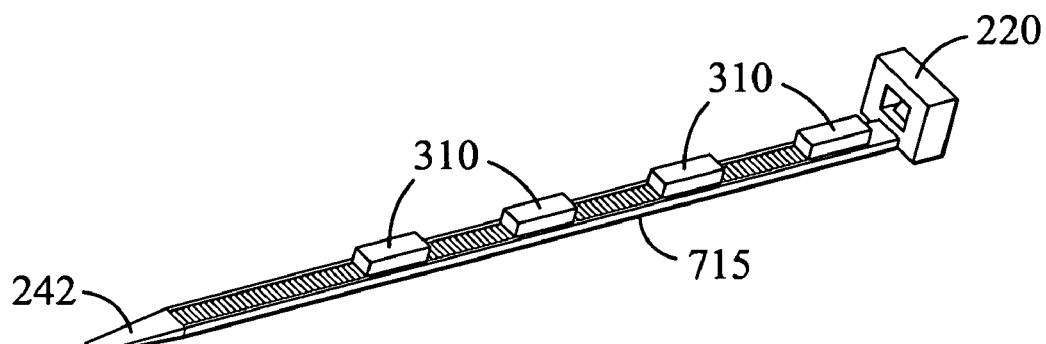
FIG. 6 is an illustration of an embodiment of the present invention, which shows a pre-deployment of a substantially flexible member including four rigid regions.

In alternative embodiments, the rigid element 310, or more than one rigid element 310, may be located elsewhere on the substantially flexible member to form other buttress shapes or configurations. FIG. 6 illustrates an embodiment where a substantially flexible member 715 contains four rigid regions 310.

Figure 7A:
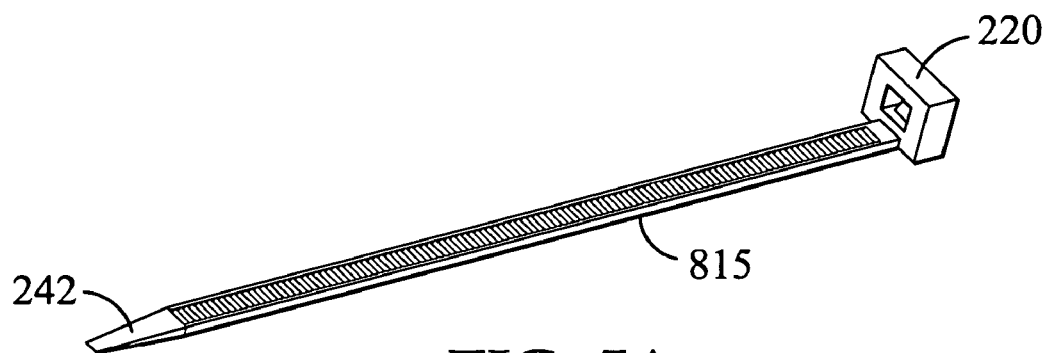
FIG. 7A is an illustration of an embodiment of the present invention, which shows a pre-deployment of a substantially flexible member, which is substantially uniform.
Figure 7B:
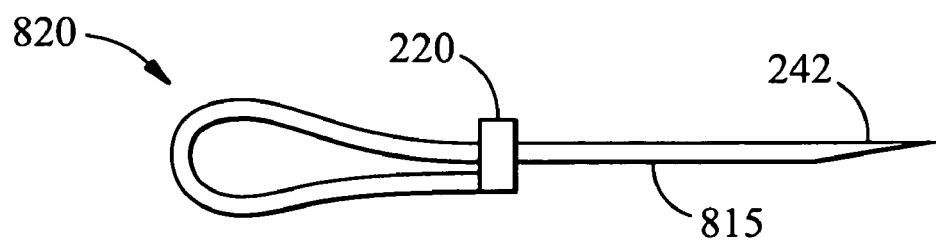
FIG. 7B is an illustration of an embodiment of the present invention shown in FIG. 7A, which shows a post-deployment of the substantially uniform, substantially flexible member.

In further embodiments, a buttress may be formed without a rigid element 310. FIG. 7A illustrates an embodiment where a substantially flexible member 815 is substantially uniform. FIG. 7B illustrates a circular buttress 820 produced by pulling the outer portion 242 of the substantially flexible member 815 through the locking mechanism 220.

Figure 8A:
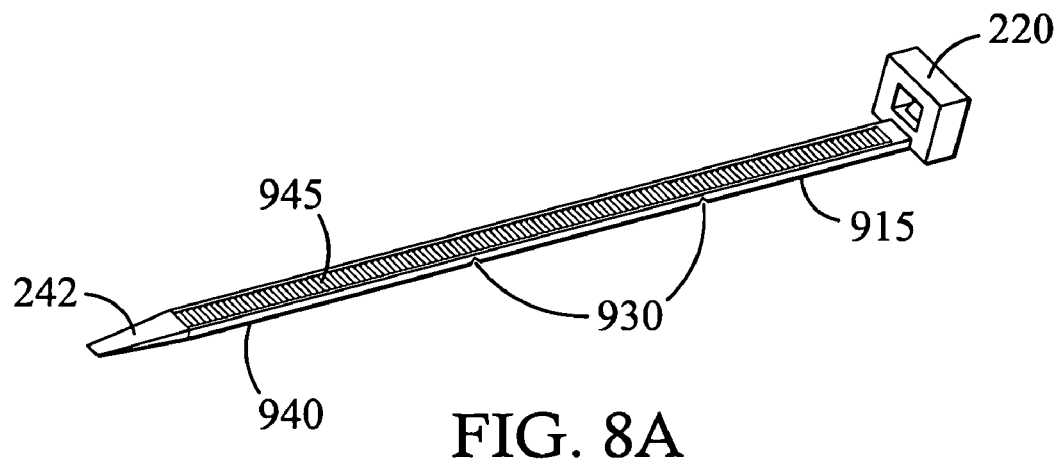
FIG. 8A is an illustration of an embodiment of the present invention, which shows a pre-deployment of a substantially flexible member including notches.
Figure 8B:
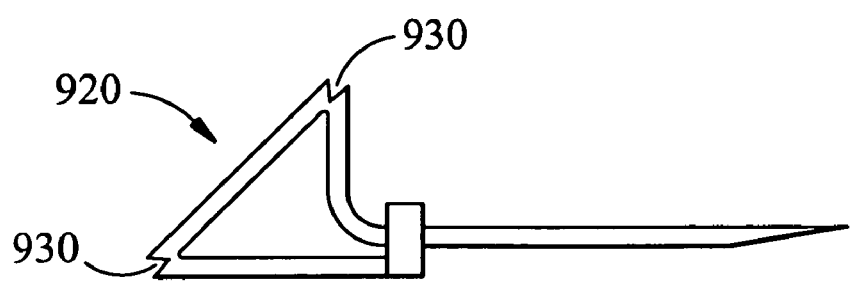
FIG. 8B is an illustration of an embodiment of the present invention shown in FIG. 8A, which shows a post-deployment of the substantially flexible member including notches.

A substantially flexible member may contain regions of substantially reduced thickness such as notches which are susceptible to bending. FIG. 8A illustrates a triangular buttress 920 produced by pulling the outer portion 242 of a substantially flexible member 915 containing two spatially separated notches 920, located on a side 940 of substantially flexible member 915 opposite a side 945 containing grooves 219, through the locking mechanism 220. Inclusion of different numbers and locations of the notches 920 results in buttresses of different shapes.

Although the invention has been described with respect to various embodiments, it should be realized that this invention is also capable of a wide variety of further and other embodiments within the spirit and the scope of the appended claims.

What is claimed is:

1. A device to be fixedly secured to a component, the device comprising:
   a structure, the structure including at least one outer flange;
   a substantially flexible member, said substantially flexible member including an outer portion, an inner portion, and a rigid region; and
   a locking mechanism, said locking mechanism capable of being coupled to said substantially flexible member in order to secure said structure to the component;
   wherein said rigid region lies between said outer portion and said inner portion of said substantially flexible member; and
   wherein said substantially flexible member is coupled to a rigid channel at said rigid region.

2. The device of claim 1, wherein the device is an electrical work box and said structure is a container.

3. The device of claim 2, wherein said rigid region is an inner flange.

4. The device of claim 3, wherein said inner flange is located at said inner portion of said substantially flexible member.

5. The device of claim 2, wherein said locking mechanism is integral with said container.

6. The device of claim 2, wherein said container further includes at least one side channel.

7. The device of claim 2, wherein said rigid region is integral with said substantially flexible member.

8. The device of claim 2, wherein said inner portion of said substantially flexible member is coupled to said container.

9. The device of claim 2, wherein said substantially flexible member is integral with said locking mechanism.

10. The device of claim 2, wherein said container is made substantially of metal.

11. The device of claim 2, wherein said container is made substantially of a thermoplastic material.

12. The device of claim 2, wherein said container is made substantially of a thermoset material.

13. An electrical workbox to be fixedly secured to a component, the electrical workbox comprising:
   a container, said container including at least one outer flange;
   a substantially flexible member, said substantially flexible member including an outer portion, an inner portion, and a rigid region, said rigid region lying between said outer portion and said inner portion of said substantially flexible member; and
   a locking mechanism, said locking mechanism capable of being coupled to said substantially flexible member in order to secure said container to the component;
   wherein said substantially flexible member further includes at least one groove, and
   wherein said rigid region lies between said container and the component when said substantially flexible member is locked in position so as to create a triangular-like portion.

14. The device of claim 13, wherein said locking mechanism further includes a flap with an edge complementary to said at least one groove.

15. The device of claim 13, wherein said locking mechanism is intergal with said container.

16. The device of claim 13, wherein said inner portion of said substantially flexible member is couple to said container.

17. The device of claim 13, wherein said substantially flexible member is integral with said locking mechanism.

18. The device of claim 13, wherein said container is made substantially of metal.

19. The device of claim 13, wherein said container is made substantially of a thermoplastic material.

20. The device of claim 13, wherein said container is made substantially of a thermoset material.

21. A method for mounting a structure to a component, the method comprising:
   inserting a substantially flexible member through an opening within the component, further through an opening in a portion of the structure of a device, and through a locking mechanism;
   inserting the structure into an opening in the component;
   pulling said substantially flexible member through said looking mechanism until a rigid region of said substantially flexible member is coupled between a surface of the component and the structure when an outer portion of said substantially flexible member is engaged with said locking mechanism; and
   engaging a flap of said locking mechanism with a recess in said outer portion of said substantially flexible member to lock the substantially flexible member in place.

22. The method of claim 21, wherein the device is an electrical work box and the structure is a container.

23. The method of claim 22, further including resting an outer flange on an outer surface of the component.

24. The method of claim 22, wherein said locking mechanism is integral with said container.

25. The method of claim 22, wherein an inner portion of said substantially flexible member is coupled to the container.

26. The method of claim 21, wherein said recess is a groove.

27. The method of claim 21, wherein said recess is an opening.

28. The method of claim 21, further including creating an opening in the component.

29. The method of claim 21, wherein the component comprises a wall.

30. The method of claim 21, wherein the component comprises a ceiling.

31. The method of claim 21, wherein the component comprises a floor.

32. The method of claim 21, wherein said locking mechanism is integral with said substantially flexible member.

33. The method of claim 21, wherein said rigid region lies between said outer portion and an inner portion of said substantially flexible member.

34. The method of claim 21, wherein said rigid region is integral with said substantially flexible member.

35. The method of claim 21, wherein said substantially flexible member is transportable through said locking mechanism in a single direction.

36. A method for mounting a structure to a component, the method comprising:
   inserting a substantially flexible member through an opening within the component further through an opening in a portion of the structure of a device, and through a locking mechanism;
   inserting the structure into an opening in the component; and
   pulling said substantially flexible member through said locking mechanism until a rigid region of said substantially flexible member is coupled between a surface of the component and the structure when an outer portion of said substantially flexible member is engaged with said locking mechanism; and
   wherein said substantially flexible member is coupled to a rigid channel at said rigid region.

* * * * *